United States Patent [19]

Michalak et al.

[11] Patent Number: 4,509,584

[45] Date of Patent: Apr. 9, 1985

[54] HEAT-TRANSFERRING ELEMENTS FOR REGENERATIVE HEAT EXCHANGE IN GAS-GAS FLUIDIZED BED HEAT EXCHANGERS

[75] Inventors: Stanislaw Michalak, Reichshof; Bernd Hermanns, Gummersbach-Rebbelroth, both of Fed. Rep. of Germany

[73] Assignee: Apparatebau Rothemühle Brandt & Kritzler GmbH, Wenden, Fed. Rep. of Germany

[21] Appl. No.: 421,488

[22] Filed: Sep. 22, 1982

[30] Foreign Application Priority Data

Apr. 16, 1982 [DE] Fed. Rep. of Germany ...... 3213972

[51] Int. Cl.³ .............................................. F28D 19/02
[52] U.S. Cl. ........................................ 165/10; 165/5; 165/104.16; 165/8
[58] Field of Search ............... 165/4, 5, 10, 8, 104.16; 261/DIG. 12

[56] References Cited

U.S. PATENT DOCUMENTS

| | | | |
|---|---|---|---|
| 1,796,501 | 3/1931 | Berl | 261/DIG. 12 |
| 3,887,672 | 6/1975 | Stahnecker et al. | 261/DIG. 12 |
| 4,310,046 | 1/1982 | Michalab | 165/104.16 |
| 4,361,182 | 11/1982 | Michalab | 165/104.16 |

FOREIGN PATENT DOCUMENTS

| | | | |
|---|---|---|---|
| 256095 | 8/1926 | United Kingdom | 165/10 |
| 445045 | 4/1936 | United Kingdom | 165/4 |
| 895463 | 5/1962 | United Kingdom | 165/4 |

OTHER PUBLICATIONS

Koch Engineering Co. Inc., *Flexisaddles*, Bulletin FS-1, 8/1975.
Norton Chemical Process Products, *Tower Packings*, N-60-B, 8/1977.

*Primary Examiner*—Albert W. Davis, Jr.
*Attorney, Agent, or Firm*—Becker & Becker, Inc.

[57] ABSTRACT

Heat-transferring elements for regenerative heat exchange in a gas-gas fluidized bed heat exchanger. The elements are in the form of separate, freely movable saddle-shaped bodies. The saddle-shaped elements may have one or more holes, and may also, or alternatively, have one or more hollow spaces or chambers which are filled entirely or partially with materials of high heat-retaining capacity, and/or with latent storage masses.

4 Claims, 5 Drawing Figures

HEAT-TRANSFERRING ELEMENTS FOR REGENERATIVE HEAT EXCHANGE IN GAS-GAS FLUIDIZED BED HEAT EXCHANGERS

The present invention relates to heat-transferring elements for regenerative heat exchange in a gas-gas fluidized bed heat exchanger.

Conventional gas-gas heat exchangers generally operate with rigidly installed heat-storage or heat-retaining masses in the form of sheets, pipes, tubes, or laminations. Frequently, metals or metal alloys are used because of their good thermal conductivity. In a corrosive environment, which is present in many applications, coated or, for instance ceramic, materials have to be used, at the expense of thermal conductivity. In order, nevertheless, to obtain an adequate heat transfer, the surface area of the heat exchanger plates or elements is increased by corrugations, ribs, or the like. This corrugated or rib formation, however, increases the danger of incrustation, for instance when used in dust-containing gases, and requires a correspondingly high cost for cleaning systems. The problem of the danger of incrustation also occurs, to a lesser extent, when the heat-storage or heat-retaining elements are placed in bulk or fill layers (for instance, according to German Patent No. 914,049; U.S. Pat. No. 3,872,918—Stalker, dated March 25, 1975; and British Pat. 1,042,161).

These problems can be solved by using heat-transferring elements in a fluidized bed. On the one hand, the heat transfer in a fluidized bed is greater than on rigid exchanger surfaces or in a vibrating bed, and on the other hand, the surfaces of the elements are self-cleaning during operation due to friction and collision (U.S. Pat. No. 4,310,046—Michalak, dated Jan. 12, 1982 and belonging to the assignee of the present invention).

Spherical elements are generally proposed for use in fluidized bed heat exchangers, since such spherical elements form a stable fluidized bed, have good self-cleaning characteristics, and can be easily filled with heat-retaining substances (U.S. Patent application Ser. No. 197,796—Michalak, filed Oct. 17, 1980—now U.S. Pat. No. 4,361,182—Michalak, dated Nov. 30, 1982 and belonging to the assignee of the present invention, and U.S. Patent application Ser. No. 292,032—Michalak, filed Aug. 11, 1981, now abandoned, and also belonging to the assignee of the present invention).

However, a drawback of spherical bodies is that they have the smallest surface of all geometric bodies. If the heat exchanger surface has to be increased, this is only possible by increasing the number of spherical bodies.

It is therefore an object of the present invention to develop heat-transferring elements which have a greater specific surface than spheres without having to accept disadvantages with regard to the aerodynamic behavior or the self-cleaning performance.

This object, and other objects and advantages of the present invention, will appear more clearly from the following specification in connection with the accompanying drawings, in which.

The heat-transferring element of the present invention is characterized primarily in that the elements have a saddle shape, and in particular are in the form of separate, freely movable saddle-shaped bodies. The inventive elements have an excellent behavior in the fluidized bed; the increased turbulence compared with spherical bodies can additionally be observed in an improvement of the heat transfer. Thus, it is possible, in all cases in which the heat exchanger surface is the determinative factor for the design, to reduce the material used, whereby necessarily also the pressure losses in the heat exchanger decrease.

Additionally, with the these inventive elements, which have a surface construction, heat can be transferred from both sides into the element, which has a thickness of, for example, 1 mm to 3 mm, while with a hollow sphere structure having the same wall thickness, heat can only be transferred on one side. Consequently, materials having a lower thermal conductivity can be used for the inventive elements, which can be very important if, for corrosion reasons, for instance synthetic materials must be used.

Figure 1:
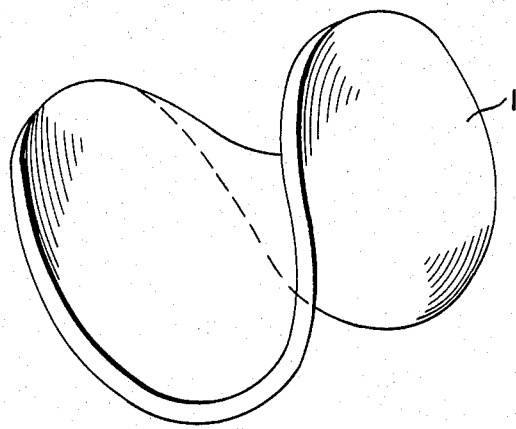
FIG. 1 is a perspective view showing one embodiment of a heat-transferring element according to the present invention.
Figure 2:
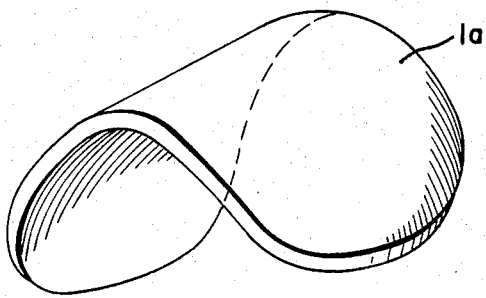
FIG. 2 is a perspective view showing another embodiment of a heat-transferring element according to the present invention.

Referring now to the drawings in detail, FIGS. 1 and 2 are perspective views showing two different embodiments of the heat-transferring elements 1 and 1a according to the present invention.

Figure 3:
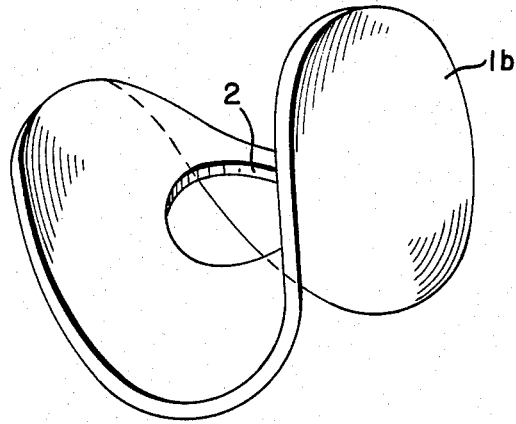
FIG. 3 shows a further perspective view of another embodiment of a heat-transferring element having a hole therein.

FIG. 3 is a perspective view of a heat-transferring element 1b having a hole or bore 2; these holes (one hole or more holes 2 can be provided) improve the aerodynamic behavior of the heat-transferring element 1b still further.

Figure 4:
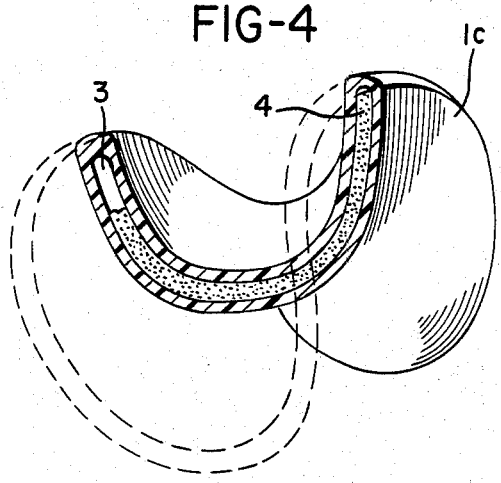
FIG. 4 is a perspective view of a heat-transferring element partially sectioned to illustrate a hollow space filled with a heat-retaining mass.
Figure 5:
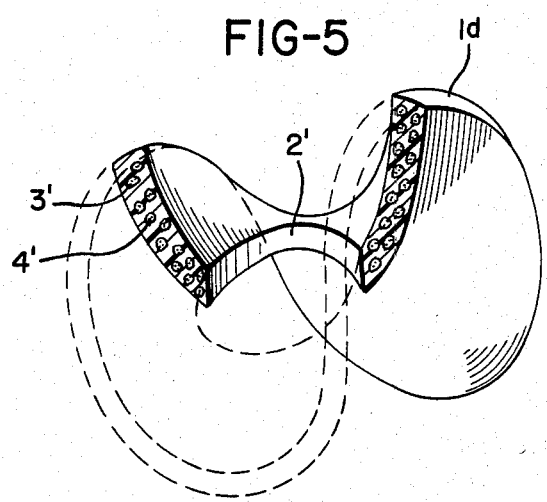
FIG. 5 is a perspective view of another heat-transferring element partially sectioned to show a hollow space filled with a heat-retaining mass.

FIGS. 4 and 5 illustrate heat-transferring elements 1c and 1d respectively, each having one or more hollow spaces or chambers 3, 3' partially or entirely filled with masses or materials, 4, 4' respectively, the latter being materials having a high heat-retaining capacity, or latent storage masses.

The elements may comprise synthetic material, or may be coated with synthetic material. To improve its physical and/or chemical properties, this synthetic material may be mixed with reinforcing or filling materials.

The elements may comprise compounded or uncompounded polyolefins or fluorine-containing synthetic materials.

The elements may contain hydrated salts, such as hydrated magnesium nitrate, as a latent storage mass in one or more hollow spaces or chambers thereof.

The substances introduced to increase the heat-retaining capacity may be introduced into the elements in the form of encapsulated particles.

Saddle-shaped bodies of polypropylene with 40% talc are especially suitable for exploiting exhaust or waste heat at low temperature levels.

The advantages of the inventive saddle-shaped bodies over spheres becomes clear from the following comparison:

Saddle-shaped body of 35 mm

| -continued | |
|---|---|
| number per cubic meter (m³)(fill layer) | approximately 25,000 |
| total surface area per cubic meter (m³) | approximately 180 square meters (m²) |
| free or open volume | 73% |
| weight per cubic meter (m³) when made of polypropylene, and at a thickness of 2 mm | 164 kg |
| Sphere having a diameter of 35 mm | |
| number per cubic meter (m³)(fill layer) | approximately 22,000 |
| total surface area per cubic meter (m³) | approximately 84.6 square meters (m²) |
| free or open volume | approximately 50% |
| weight per cubic meter (m³) when made of polypropylene, and at a wall thickness of 2 mm | 137 kg |

The present invention is, of course, in no way restricted to the specific disclosure of the specification and drawings, but also encompasses any modifications within the scope of the appended claims.

What we claim is:

1. A heat-transferring element having increased surface areas as well as good thermal conducting for regenerative heat exchange in a gas-gas fluidized bed heat exchanger, said element having a greater specific surface than spheres as well as being embodied stable to withstand increased turbulence in the fluidized bed heat exchanger during heat transfer therewith as a separate and distinct, freely movable, saddle-shaped body having a self-cleaning effect and having a surface construction arcuate on opposite sides so that heat can be transferred better from both sides into the element having a thickness in a range of only 1 mm to 3 mm to reduce material content, whereby necessarily also pressure losses in the heat exchanger decrease while also having an excellent aerodynamic behavior and increased turbulence in the fluidized bed heat exchanger.

2. A heat-transferring element according to claim 1, in which said element is provided with at least one hole that further improves aerodynamic behavior of said heat transferring element and that reduces material used, whereby necessarily also pressure losses in the heat exchanger decrease.

3. A heat-transferring element according to claim 1, in which said element is at least coated with synthetic material which is mixed with other material to improve the properties thereof.

4. A heat-transferring element according to claim 3, in which said synthetic material is selected from the group consisting of compounded and uncompounded polyolefins, and fluorine-containing synthetic materials.

* * * * *